US007645718B2

(12) United States Patent
Li et al.

(10) Patent No.: US 7,645,718 B2
(45) Date of Patent: Jan. 12, 2010

(54) MICROPOROUS CRYSTALLINE MATERIAL COMPRISING A MOLECULAR SIEVE OR ZEOLITE HAVING AN 8-RING PORE OPENING STRUCTURE AND METHODS OF MAKING AND USING SAME

(75) Inventors: Hong-Xin Li, Lansdale, PA (US); William E. Cormier, Harleysville, PA (US); Bjorn Moden, Glen Mills, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 12/055,639

(22) Filed: Mar. 26, 2008

(65) Prior Publication Data

US 2008/0241060 A1 Oct. 2, 2008

Related U.S. Application Data

(60) Provisional application No. 60/907,206, filed on Mar. 26, 2007.

(51) Int. Cl.
*B01J 27/182* (2006.01)
(52) U.S. Cl. .................... 502/214; 502/60; 423/700
(58) Field of Classification Search .................. 502/60, 502/214; 423/700
See application file for complete search history.

(56) References Cited

U.S. PATENT DOCUMENTS

| 4,440,871 | A | | 4/1984 | Lok et al. |
| 4,544,538 | A | | 10/1985 | Zones |
| 4,867,954 | A | | 9/1989 | Staniulis et al. |
| 4,874,590 | A | | 10/1989 | Staniulis et al. |
| 4,961,917 | A | | 10/1990 | Byrne |
| 5,026,532 | A | | 6/1991 | Gaffney et al. |
| 5,233,117 | A | * | 8/1993 | Barger ......................... 585/640 |
| 5,417,949 | A | | 5/1995 | McWilliams et al. |
| 5,451,387 | A | | 9/1995 | Farnos et al. |
| 5,516,497 | A | | 5/1996 | Speronello et al. |
| 5,589,147 | A | | 12/1996 | Farnos et al. |
| 6,689,709 | B1 | | 2/2004 | Tran et al. |
| 6,890,501 | B2 | | 5/2005 | Delahay et al. |
| 6,914,026 | B2 | | 7/2005 | Tran et al. |
| 7,118,722 | B2 | | 10/2006 | Tran et al. |
| 7,273,827 | B2 | * | 9/2007 | Chang et al. .................. 502/64 |

FOREIGN PATENT DOCUMENTS

| EP | 0 396 085 | 11/1990 |
| EP | 0 624 393 | 11/1994 |
| EP | 1 837 489 | 9/2007 |
| WO | WO 2006/064805 | 6/2006 |

OTHER PUBLICATIONS

Ishihara et al., "Copper Ion-Exchanged SAPO-34 as a Thermostable Catalyst for Selective Reduction of NO with C3H6", Journal of Catalystis, 169, 93-102, 1997, no month.*
Ishihara et al., "Thermostable Molecular Sieves, Silicoaluminophosphate (SAPO)-34, for the Removal of NOx with C3H6 in the Coexistence of O2, H2O, and SO2", Ind. Eng. Chem. Tes., 36, 17-22, 1997, no month.*
Chen, Jiesheng et al., Silicoaluminophosphate No. eighteen (SAPO-18): a new microporous solid acid catalyst, Catalysis Letters 28 (1994) 241-248.
Frache, A., "Catalytic DeNO$_x$ activity of cobalt and copper ions in microporous MeALPO-34 and MeAPSO-34," Catalysis Today 75 (2002) 359-365.
Ishihara, Tatsumi et al., "Copper Ion Exchanged Silicoaluminophosphate (SAPO) as a Thermostable Catalyst for Selective Reduction of NO$_x$ with Hydrocarbons," Studies in Surface Science and Catalysts, 84 (1994) 1493-1500.
Ishihara, Tatsumi et al., "Selective Reduction of Nitrogen Monoxide with Propane over Cu-Silico-aluminophosphate (SAPO) under Oxidizing Atmosphere," Chemistry Letters (1992) 2119-2122.
Watanabe, Yoshihide et al., "Multinuclear NMR Studies on the Thermal Stability of SAPO-34," Journal of Catalysis 143, (1993) 430-436.
International Search Report and Written Opinion dated Jul. 10, 2008.
Centi et al., "Nature of Active Species in Copper-based Catalysts and their Chemistry of Transformation of Nitrogen Oxides" *Applied Catalysis A: General*, vol. 132, pp. 179-259 (1995).
Frache et al., "NO$_x$ Reactivity on Microporous MeAPOs. Spectroscopic and Catalytic Studies", *Studies in Surface Science Catalysis*, vol. 132, pp. 5096-5104 (2001).

* cited by examiner

*Primary Examiner*—Elizabeth D Wood
(74) *Attorney, Agent, or Firm*—Finnegan, Henderson, Farabow, Garrett & Dunner, LLP

(57) ABSTRACT

There is disclosed a hydrothermally stable microporous crystalline material comprising a molecular sieve or zeolite having an 8-ring pore opening structure, such as SAPO-34 or aluminosilicate zeolite, able to retain a specific percentage of its surface area and micropore volume after treatment with heat and moisture, such as at least 80% of its surface area and micropore volume after exposure to temperatures of up to 900° C. in the presence of up to 10 volume percent water vapor for a time ranging from 1 to 16 hours. Methods of using the disclosed crystalline material, such as in the SCR of NO$_x$ in exhaust gas are also disclosed, as are methods of making such materials.

30 Claims, 7 Drawing Sheets

MICROPOROUS CRYSTALLINE MATERIAL COMPRISING A MOLECULAR SIEVE OR ZEOLITE HAVING AN 8-RING PORE OPENING STRUCTURE AND METHODS OF MAKING AND USING SAME

This application claims the benefit of domestic priority to U.S. Provisional Patent Application No. 60/907,206, filed Mar. 26, 2007, which is herein incorporated by reference in its entirety.

The present disclosure is related to hydrothermally stable microporous crystalline materials comprising a molecular sieve or zeolite having an 8-ring pore opening structure, such as SAPO-34 or aluminosilicate zeolite, that is able to retain a specific percentage of its surface area and micropore volume after treatment with heat and moisture. The present disclosure is also related to a method of making and methods of using the disclosed crystalline materials, such as in reducing contaminants in exhaust gases. Such methods include the selective catalytic reduction ("SCR") of exhaust gases contaminated with nitrogen oxides ("$NO_x$").

Microporous crystalline materials and their uses as catalysts and molecular sieve adsorbents are known in the art. Microporous crystalline materials include crystalline aluminosilicate zeolites, metal organosilicates, and aluminophosphates, among others. One catalytic use of the materials is in the SCR of $NO_x$ with ammonia in the presence of oxygen and in the conversion process of different feed stocks, such as an oxygenate to olefin reaction system.

Medium to large pore zeolites containing metals, such as ZSM-5 and Beta, are also known in the art for SCR of $NO_x$ using reductants, such as ammonia.

A class of silicon-substituted aluminophosphates, which are both crystalline and microporous and exhibit properties characteristic of both aluminosilicate zeolites and aluminophosphates, are known in the art and disclosed in U.S. Pat. No. 4,440,871. Silicoaluminophosphates (SAPOs) are synthetic materials having a three-dimensional microporous aluminophosphate crystalline framework with silicon incorporated therein. The framework structure consists of $PO_2^+$, $AlO_2^-$, and $SiO_2$ tetrahedral units. The empirical chemical composition on an anhydrous basis is:

$mR:(Si_xAl_yP_z)O_2$ wherein, R represents at least one organic templating agent present in the intracrystalline pore system; m represents the moles of R present per mole of $(Si_xAl_yP_z)O_2$ and has a value from zero to 0.3; and x, y, and z represent the mole fractions of silicon, aluminum, and phosphorous, respectively, present as tetrahedral oxides.

U.S. Pat. No. 4,961,917 discloses a method for the reduction of $NO_x$ with ammonia using a certain class of zeolite catalysts that are sulfur-tolerant, especially when the zeolites are promoted with a promoter such as iron or copper. The zeolites disclosed therein have pore diameters of at least 7 Angstroms and are selected from the groups including USY, Beta, and ZSM-20. The catalysts employed therein maintain good catalytic properties under high temperature conditions of use, from about 250-600° C.

U.S. Pat. No. 5,451,387 discloses a method for improving the reduction activity of the zeolite catalyst at temperatures below 400° C., without adversely affecting the reduction capacity above 400° C., by introducing iron into an intermediate pore size zeolite, which are identified as ZSM-5 type zeolites. U.S. Pat. No. 6,914,026 discloses an iron-promoted aluminosilicate zeolite with improved hydrothermal stability and good catalytic activity under high temperatures, e.g., 400° C. and above, in the presence of sulfur compounds. U.S. Pat. Nos. 6,689,709 and 7,118,722 disclose stabilized iron and/or copper promoted zeolite catalysts for $NO_x$ reduction, wherein the zeolites include USY, Beta, and/or ZSM-20, and have pore diameters of at least 7 Angstroms. U.S. Pat. No. 6,890,501 discloses Beta-zeolites loaded with iron for the SCR of $NO_x$ and $N_2O$ with ammonia, wherein the zeolite was prepared by ion-exchange or impregnation.

U.S. Pat. No. 5,516,497 discloses a metal-promoted zeolite catalyst and a method for the catalytic reduction of $NO_x$ with ammonia using the catalysts in stages. The first catalyst is promoted with not more than about 1% by weight of iron and/or copper promoter, and the second catalyst is promoted with more than about 1% by weight of iron and/or copper promoter. The selectivity of the catalyst, favoring either reduction of $NO_x$ or ammonia, can be tailored by controlling the content of the promoting metal. By utilizing suitable zeolite materials, high temperature gaseous streams, up to about 600° C., may be treated without seriously affecting the life or efficiency of the catalyst.

SUMMARY

Generally, the present disclosure provides a hydrothermally stable microporous crystalline material comprising a silicoaluminophosphate (SAPO) molecular sieve or aluminosilicate zeolite having an 8-ring pore opening structure, such as microporous crystalline compositions comprising SAPO-34, SAPO-18, and high-silica chabazite. The crystalline material according to one embodiment of the present disclosure is able to retain at least 80% of its surface area and micropore volume after exposure to temperatures of up to 900° C. in the presence of up to 10 vol. % water vapor for a time ranging from 1 to 16 hours.

In one embodiment, the microporous crystalline material comprises SAPO-34, having an initial surface area of at least 650 m²/g, wherein the surface area, after being treated at 700-900° C. and 10 vol. % water vapor for a time ranging from 1 to 16 hours, is at least 90% of the initial surface area.

In another aspect of the invention, a microporous crystalline material is chosen from SAPO molecular sieves and aluminosilicate zeolites having an 8-ring pore opening structure defined by the Structure Commission of the International Zeolite Association chosen from: AEI, AFT, AFX, CHA, DDR, ERI, ITE, ITW, KFI, LEV, LTA, PAU, RHO, and UFI, wherein the material retains at least 80% of its surface area and micropore volume after exposure to temperatures of up to 900° C. in the presence of up to 10 vol. % water vapor for a time ranging from 1 to 16 hours.

In another aspect of the present disclosure, the microporous crystalline materials are cation exchanged, for example exchanged with iron or copper. In one embodiment, the material, such as SAPO-34 and high-silica chabazite, is cation exchanged with iron, wherein the iron oxide comprises at least 0.20 weight percent of the total weight of the material. In another embodiment, the material, such as SAPO-34 and high-silica chabazite, is cation exchanged with copper, wherein copper oxide comprises at least 1.0 weight percent of the total weight of the material.

Other aspects of the present disclosure include methods of SCR of $NO_x$ in exhaust gas. One such method comprises contacting, in the presence of ammonia or urea, exhaust gas with a hydrothermally stable microporous crystalline material comprising a molecular sieve or zeolite having an 8-ring pore opening structure, including SAPO-34, SAPO-18, and high-silica chabazite, wherein the crystalline material retains at least 80% of its surface area and micropore volume after exposure to temperatures of up to 900° C. in the presence of up to 10 vol. % water vapor for a time ranging from 1 to 16 hours.

Another aspect of the disclosed method comprises contacting, in the presence of ammonia or urea, exhaust gas with a microporous crystalline material chosen from molecular sieves and zeolites having an 8-ring pore opening structure defined by the Structure Commission of the International Zeolite Association chosen from: AEI, AFT, AFX, CHA, DDR, ERI, ITE, ITW, KFI, LEV, LTA, PAU, RHO, and UFI, wherein the material retains at least 80% of its surface area and micropore volume after exposure to temperatures of up to 900° C. in the presence of up to 10 vol. % water vapor for a time ranging from 1 to 16 hours.

Another aspect of the disclosed method comprises contacting, in the presence of ammonia or urea, exhaust gas with a hydrothermally stable microporous material comprising a molecular sieve or zeolite having an 8-ring pore opening structure, wherein the microporous material comprises iron and/or copper and retains at least 80% of its surface area and micropore volume after exposure to temperatures of up to 900° C. in the presence of up to 10 vol. % water vapor for up to 1 hour.

There is also disclosed a method for making a microporous crystalline material comprising a molecular sieve or zeolite having an 8-ring pore opening structure, the method comprising mixing sources of alumina, silica, and optionally phosphate in case of SAPOs, with a TEAOH solution or an organic structural directing agent (SDA) and water to form a gel, heating the gel in an autoclave at a temperature ranging from 150 to 180° C. for a time ranging from 12-60 hours to form a product, cooling and optionally washing the product in water, calcining the product to form a molecular sieve or zeolite having an 8-ring pore opening structure, wherein the crystalline material retains at least 80% of its surface area and micropore volume after exposure to temperatures of up to 900° C. in the presence of up to 10 vol. % water vapor for a time ranging from 1 to 16 hours.

Aside from the subject matter discussed above, the present disclosure includes a number of other exemplary features such as those explained hereinafter. It is to be understood that both the foregoing description and the following description are exemplary only.

BRIEF DESCRIPTION OF THE DRAWINGS

The accompanying figures are incorporated in, and constitute a part of this specification.

DEFINITIONS

Figure 1:
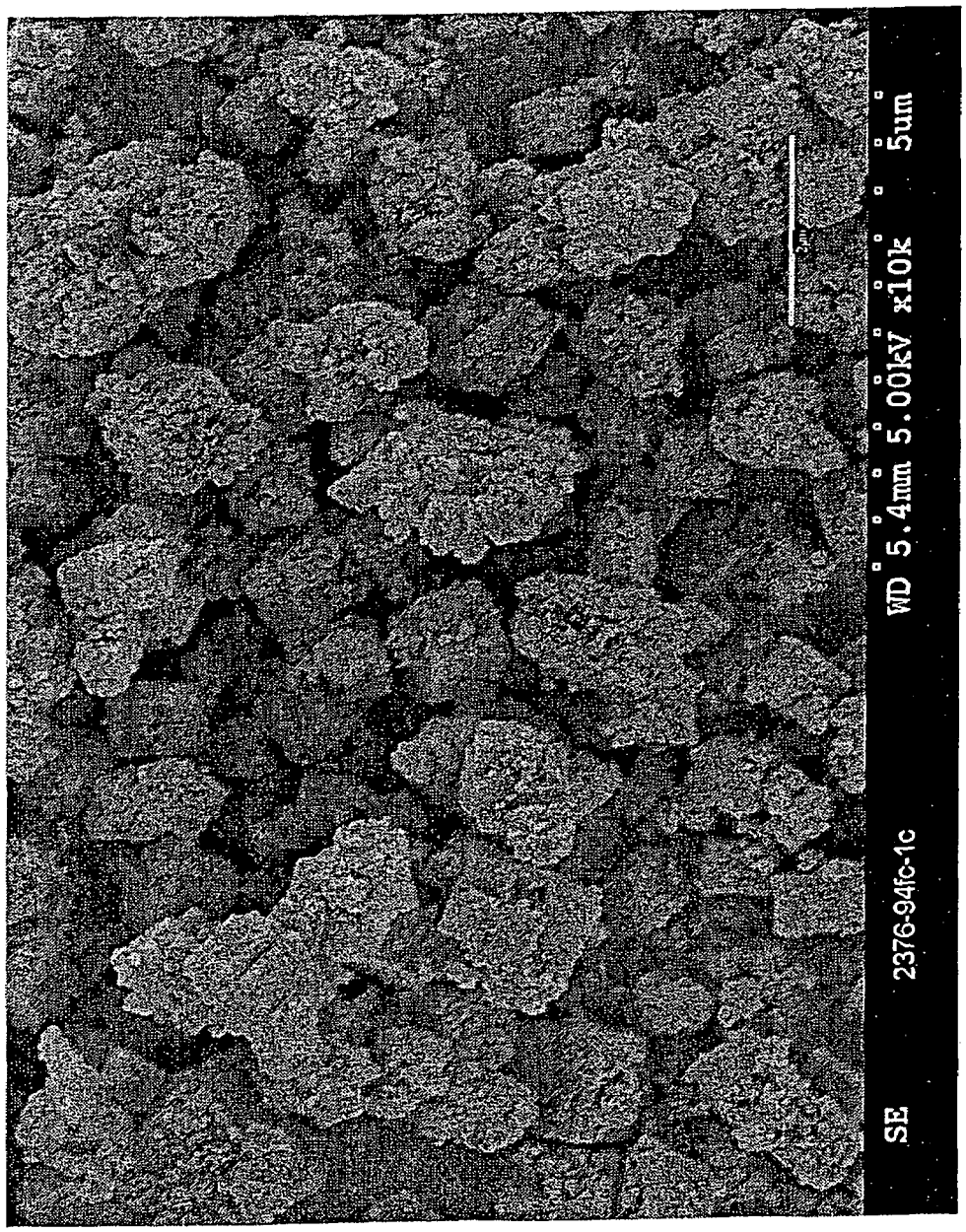
FIG. 1 is a SEM of the SAPO-34 material described in Example 1, before aging or cation-exchange.
Figure 2:
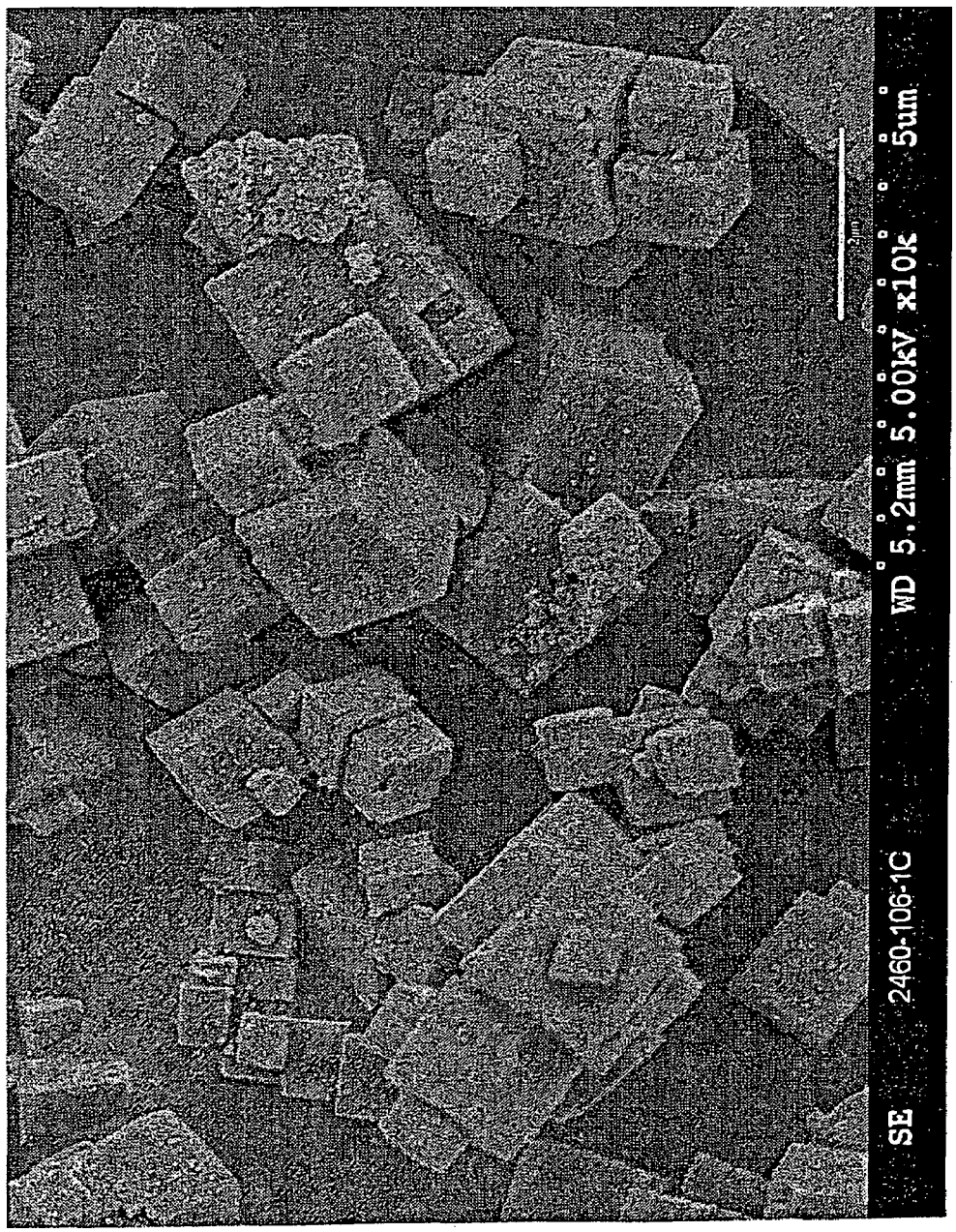
FIG. 2 is a SEM of the SAPO-34 material described in Example 2, before aging or cation-exchange.
Figure 3:
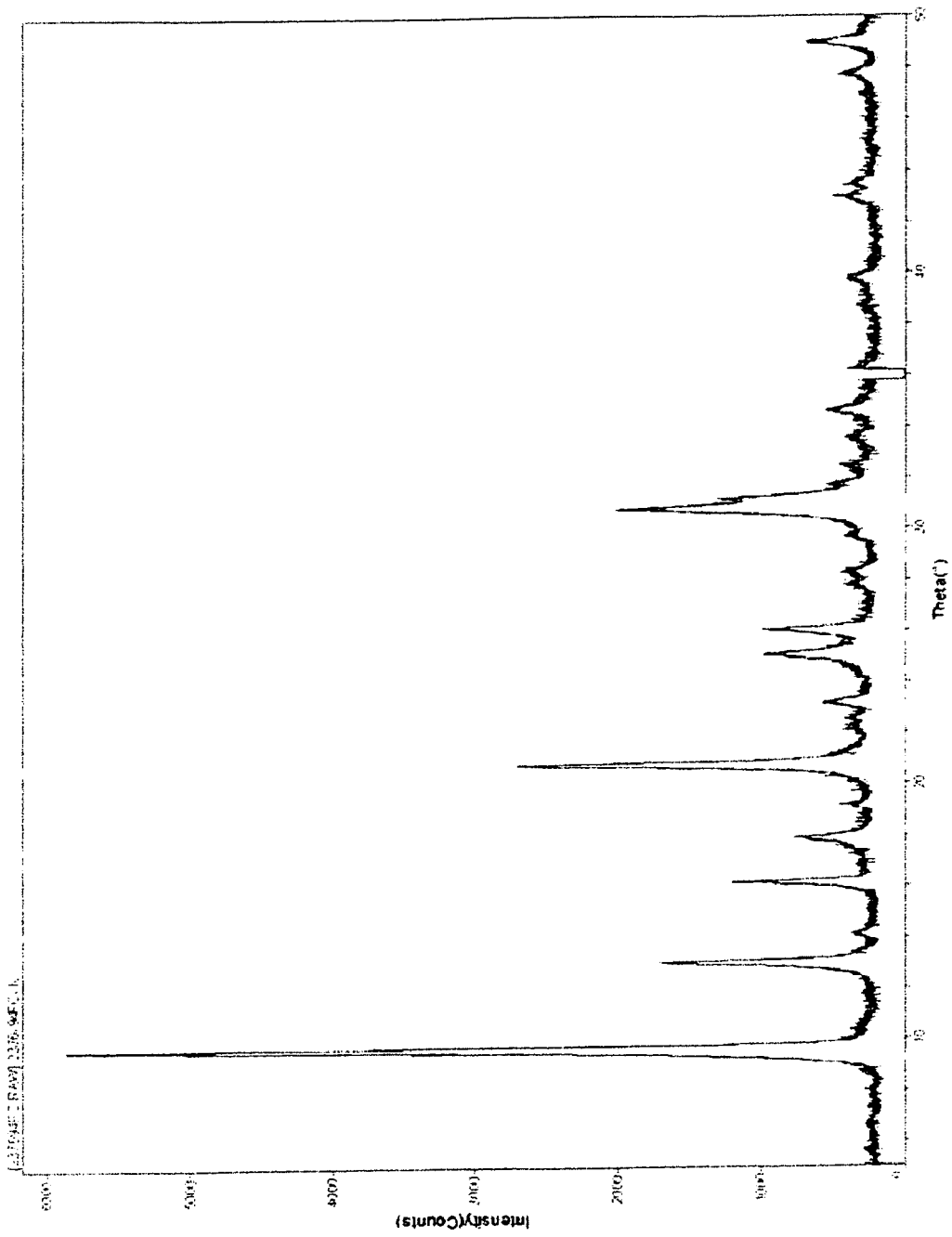
FIG. 3 is a XRD of the SAPO-34 material described in Example 1, before aging or cation-exchange.
Figure 4:
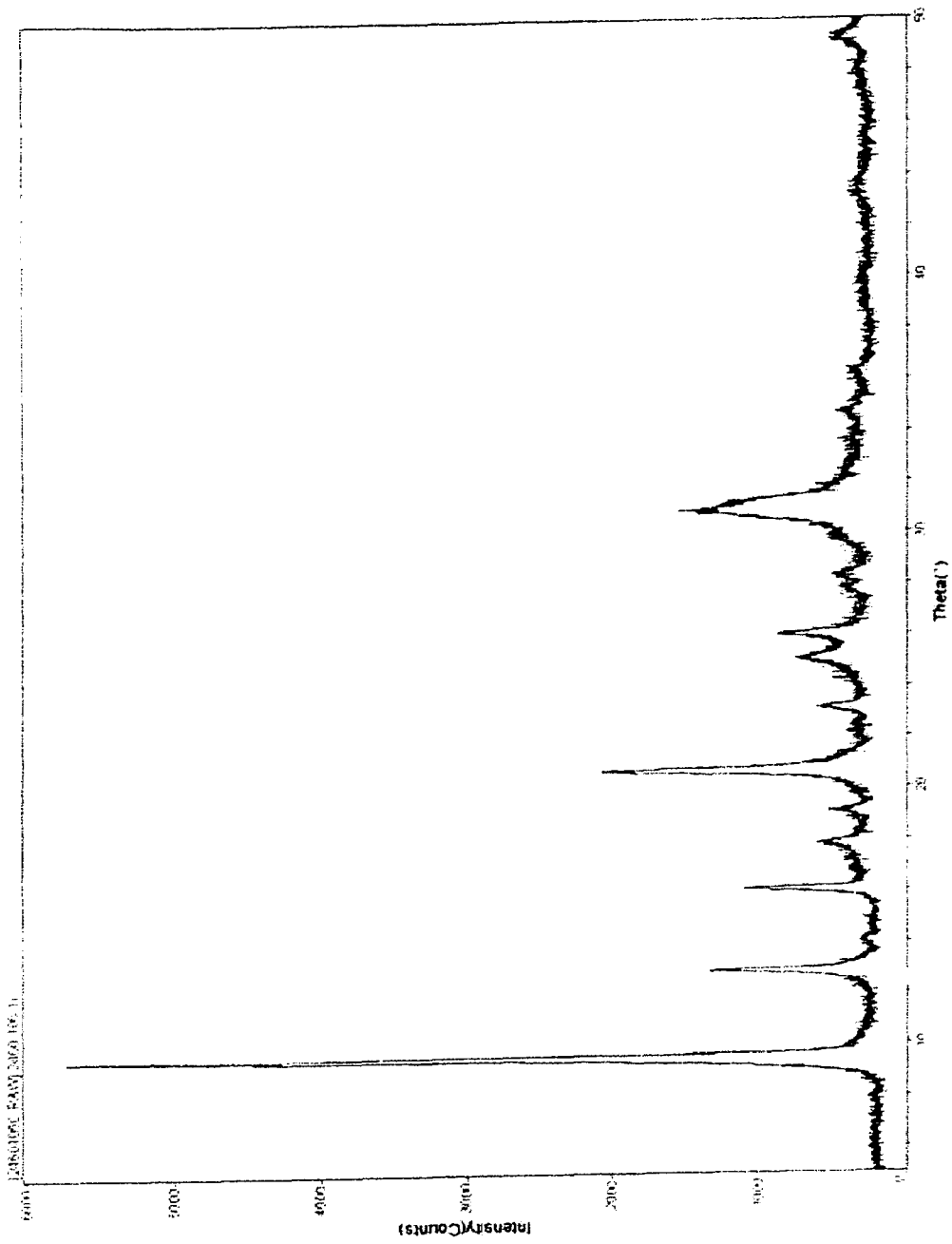
FIG. 4 is a XRD of the SAPO-34 material described in Example 2, before aging or cation-exchange.
Figure 5:
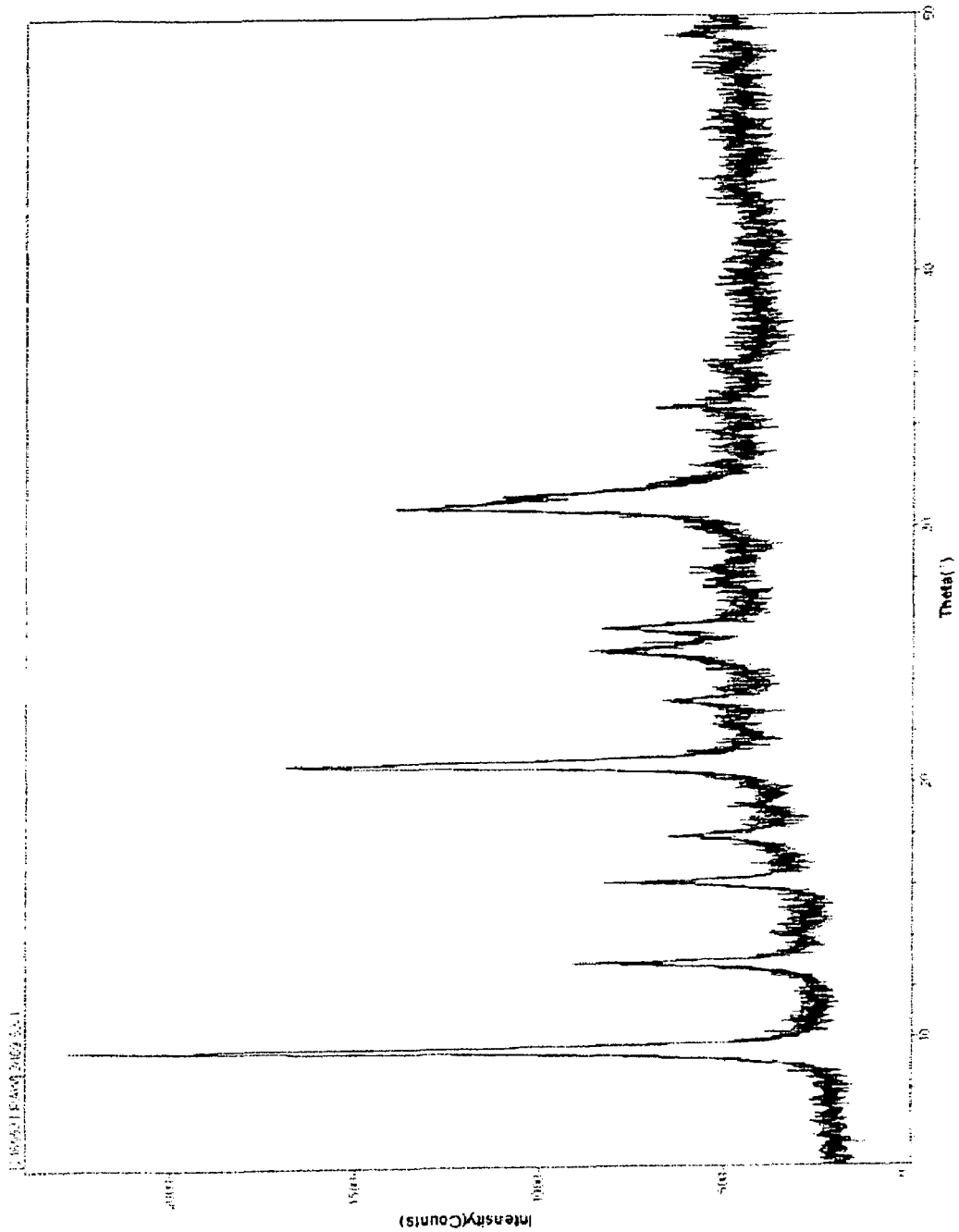
FIG. 5 is a XRD of the Cu-exchanged SAPO-34 material described in Example 1 after hydrothermal aging at 800° C.
Figure 6:
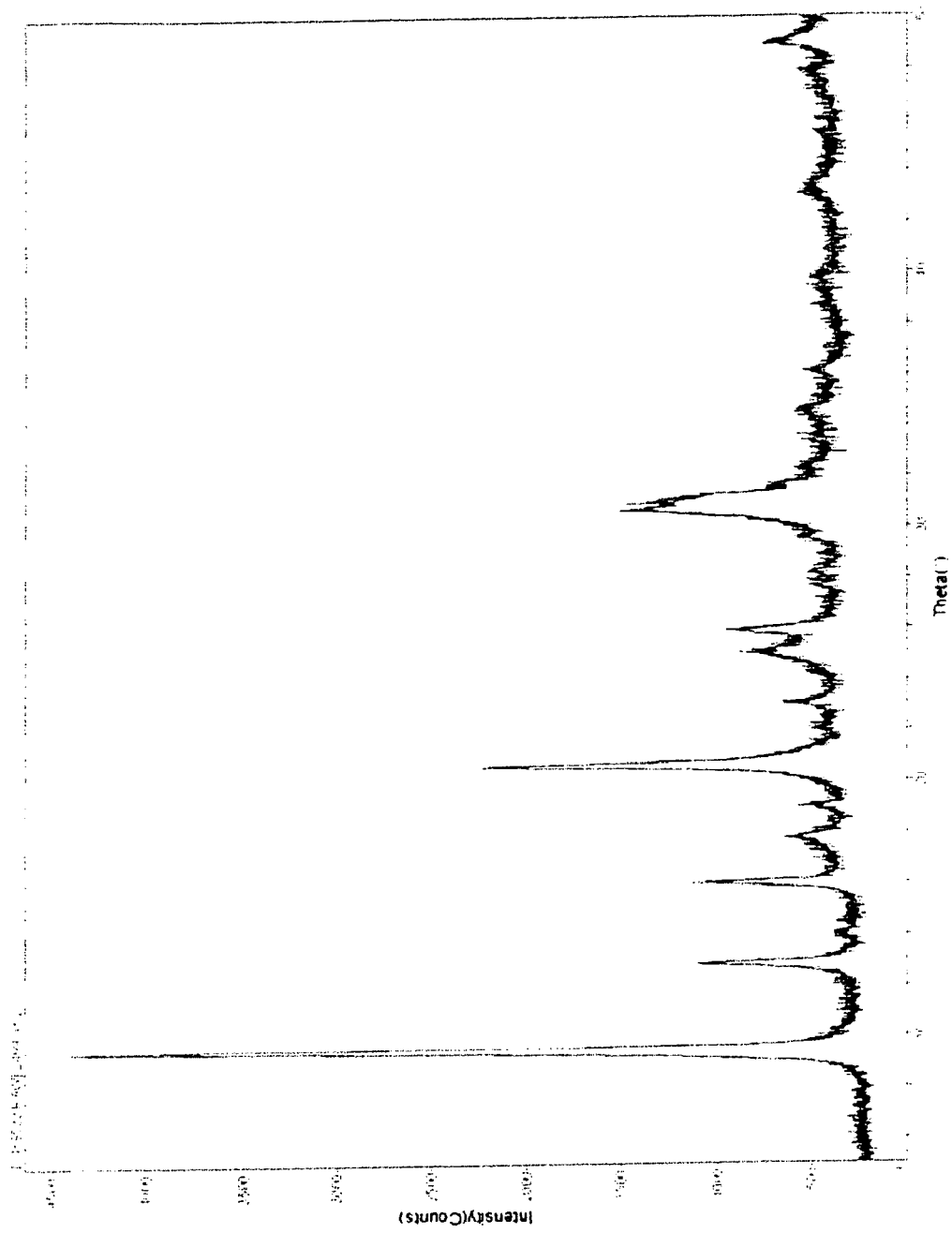
FIG. 6 is a XRD of the Cu-exchanged SAPO-34 material described in Example 2 after hydrothermal aging at 800° C.
Figure 7:
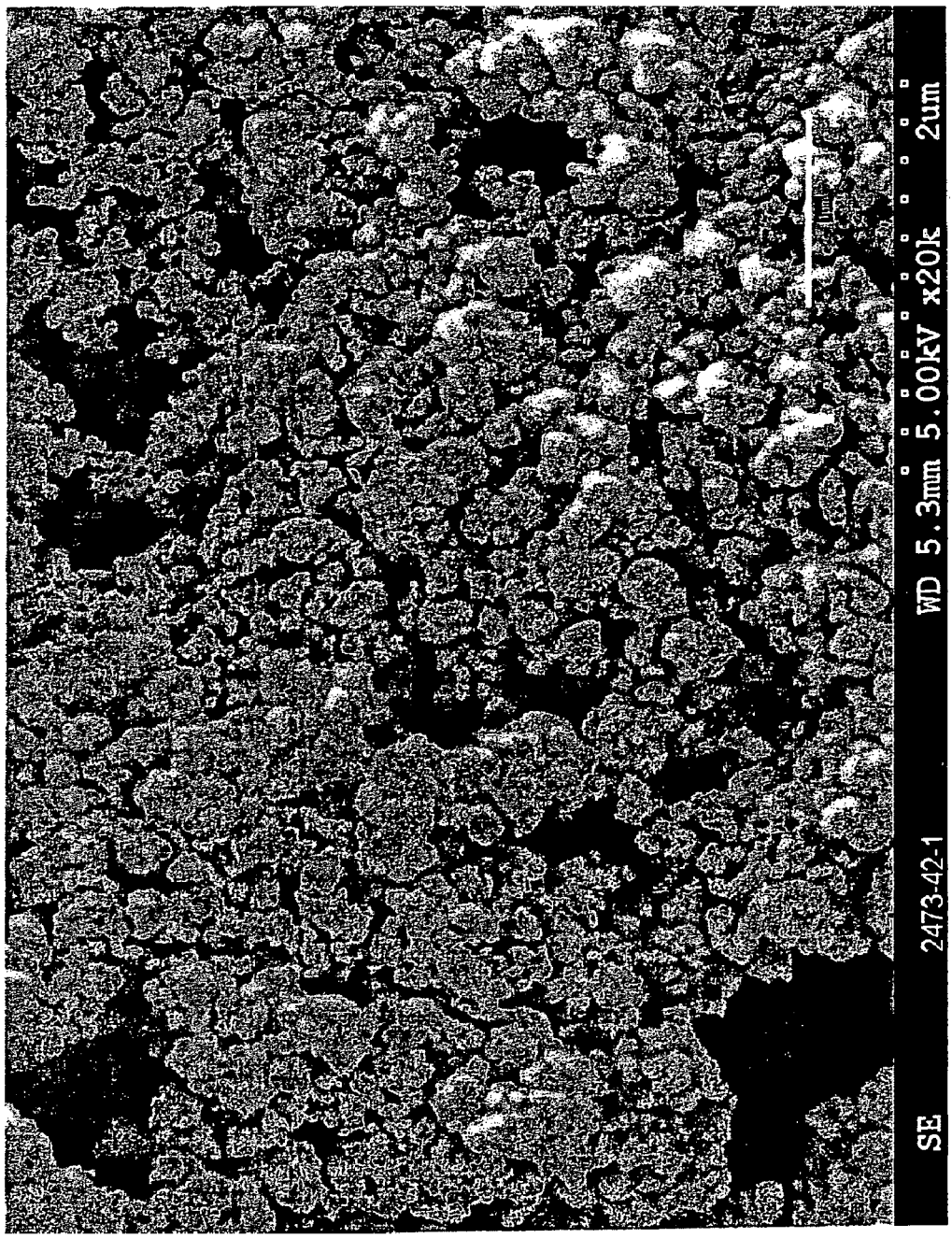
FIG. 7 is a SEM of the SAPO-34 material described in Comparative Example 2, before aging or cation-exchange.

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 80%, such as at least 85%, at least 90%, or even at least 95%, of its surface area and micropore volume after exposure to conditions simulating those present in an automobile exhaust, such as temperatures ranging up to 900° C. in the presence of up to 10 volume percent (vol %) water vapor for times ranging from up to 1 hour, or even up to 16 hours, such as for a time ranging from 1 to 16 hours.

"Initial Surface Area" means the surface area of the freshly made crystalline material before exposing it to any aging conditions.

"Initial Micropore Volume" means the micropore volume of the freshly made crystalline material before exposing it to any aging conditions.

"Direct synthesis" (or any version thereof) refers to a method that does not require a metal-doping process after the zeolite has been formed, such as a subsequent ion-exchange or impregnation method.

"Defined by the Structure Commission of the International Zeolite Association," is intended to mean those structures included but not limited to, the structures described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with ammonia) in the presence of oxygen to form nitrogen and $H_2O$.

"Exhaust gas" refers to any waste gas formed in an industrial process or operation and by internal combustion engines, such as from any form of motor vehicle.

DETAILED DESCRIPTION OF THE INVENTION

The microporous crystalline materials comprising a molecular sieve or zeolite having an 8-ring pore opening structure of the present invention exhibit good hydrothermal properties, as evidenced by the stability of the surface area and micropore volume after exposure to high temperatures and humidity. For example, after being treated at up to 900° C. in the presence of up to 10 vol % water vapor for a time ranging from 1 to 16 hours, the microporous crystalline materials of the present invention maintain at least 80% of their initial surface area. Likewise, after the treatment, the microporous crystalline materials of the present invention maintain at least 80% of their initial micropore volume.

Microporous crystalline materials of the present invention may have an initial surface area of at least 650 $m^2/g$, such as at least 700 $m^2/g$, or even up to 800 $m^2/g$.

Microporous crystalline materials of the present invention may have an initial micropore volume of at least 0.25 cc/g, such as 0.30 cc/g.

The microporous crystalline materials of the present invention comprise molecular sieves or zeolites, including SAPO-34, high-silica chabazite, or those having a structure defined by the Structure Commission of the International Zeolite Association as CHA. The SAPO-34 structure of the present invention may contain $SiO_2$ in an amount ranging from 1-20% and may have a crystal size greater than 0.3 microns. In another embodiment, the high-silica chabazite of the present invention may have a silica-to-alumina ratio ("SAR") greater than 15, such as ranging from 15-60.

The microporous crystalline materials of the present invention also comprise SAPO molecular sieves and aluminosilicate zeolites having an 8-ring pore opening structure defined by the Structure Commission of the International Zeolite Association chosen from: AEI, AFT, AFX, CHA, DDR, ERI, ITE, ITW, KFI, LEV, LTA, PAU, RHO, and UFI. These materials also exhibit the hydrothermal stability properties described herein, such as retaining at least 80% of their initial surface area and initial micropore volume after being treated at temperatures of up to 900° C. in the presence of up to 10 vol % water vapor for a time ranging from 1 to 16 hours. These materials may be an aluminosilicate having a SAR greater than 15, such as ranging from 20-60. Alternatively, these materials may also be SAPO molecular sieve structures containing $SiO_2$ in an amount ranging from 1-20%.

SAPO-34 compositions of the present invention exhibit good hydrothermal and thermal properties as identified herein. For example, after being treated at temperatures up to 900° C. in the presence of up to 10 vol % water vapor for 16 hours, the SAPO-34 compositions of the present invention maintain at least 80% of their initial surface area, such as at least 85%, at least 90%, or even at least 95%. Likewise, after the treatment, the SAPO-34 compositions of the present invention maintain at least 80% of their initial micropore volume, such as 85%, and even 90% of their initial micropore volume.

The microporous crystalline materials of the present invention may comprise iron and/or copper. In one embodiment, the iron and/or copper are introduced into the microporous crystalline material by liquid-phase or solid ion-exchange or incorporated by direct-synthesis.

The present invention also is directed to hydrothermally stable microporous materials comprising a molecular sieve or zeolite having an 8-ring pore opening structure for SCR of $NO_x$ with urea or ammonia, wherein the microporous material comprises iron and/or copper and retains at least 80% of its surface area and micropore volume after exposure to temperatures of up to 900° C. and up to 10% water for up to 1 hour. The iron oxide may comprise at least 0.20 weight percent of the total weight of the material, and the copper oxide may comprise at least 1.0 weight percent of the total weight of the material.

In SAPO-34 compositions resulting from iron cation exchange, iron oxide comprises at least 0.20 weight percent of the total weight of the composition, such as 0.25 weight percent, or even 0.30 weight percent. The resulting iron cation-exchanged SAPO-34 compositions have a surface area of at least 250 m$^2$/g, such as at least 400 m$^2$/g, and even at least 600 m$^2$/g.

In SAPO-34 compositions resulting from copper cation-exchange, copper oxide comprises at least 1.90 weight percent of the total weight of the composition, such as 1.95 weight percent, and even 2.00 weight percent. The resulting copper cation-exchanged SAPO-34 compositions have a surface area of at least 550 m$^2$/g, such as at least 600 m$^2$/g, and even at least 650 m$^2$/g.

The resulting cation-exchanged SAPO-34 compositions also exhibit good hydrothermal and thermal properties, as evidenced by the stability of the surface area after exposure to high temperatures and humidity. For example, after being treated at temperatures up to 900° C. in the presence of up to 10 vol % water vapor for up to 1 hour, the iron cation-exchanged SAPO-34 compositions of the present invention maintain at least 20% of their initial surface area, such as at least 40%, and even at least 60%.

The microporous crystalline materials of the present invention are useful as exhaust catalysts, such as for reduction of $NO_x$ in automotive exhaust, in part because of their good thermal and hydrothermal stability. Under extreme conditions, automotive exhaust catalysts are exposed to heat up to and in excess of 900° C. Therefore, some automotive exhaust catalysts are required to be stable at temperatures up to and in excess of 900° C.

The present invention is also directed to a method for reduction, typically prior to discharge, of exhaust gas. As mentioned, reference to "exhaust gas" refers to any waste gas formed in an industrial process or operation and by internal combustion engines, the composition of which varies. Non-limiting examples of the types of exhaust gases that may be treated with the disclosed materials include both automotive exhaust, as well as exhaust from stationary sources, such as power plants, stationary diesel engines, and coal-fired plants.

For example, the present invention is directed to a method for SCR of exhaust gases contaminated with $NO_x$. The nitrogen oxides of exhaust gases are commonly NO and $NO_2$; however, the present invention is directed to reduction of the class of nitrogen oxides identified as $NO_x$. Nitrogen oxides in exhaust are reduced with ammonia to form nitrogen and water. As previously mentioned, the reduction can be catalyzed to preferentially promote the reduction of the $NO_x$ over the oxidation of ammonia by the oxygen, hence "selective catalytic reduction."

The inventive method for SCR of $NO_x$ in exhaust gases comprises contacting, in the presence of ammonia or urea, exhaust gas with a hydrothermally stable microporous crystalline material comprising a molecular sieve or zeolite having an 8-ring pore opening structure, wherein the crystalline material retains at least 80% of its surface area and micropore volume after exposure to temperatures of up to 900° C. in the presence of up to 10 vol % water vapor for a time ranging from 1 to 16 hours. In one embodiment, the molecular sieves and zeolites having an 8-ring pore opening structure comprising the microporous crystalline material may be chosen from those structures defined by the Structure Commission of the International Zeolite Association as AEI, AFT, AFX, CHA, DDR, ERI, ITE, ITW, KFI, LEV, LTA, PAU, RHO, and UFI.

The inventive method of SCR of $NO_x$ in exhaust gas also comprises contacting, in the presence of ammonia or urea, exhaust gas with a hydrothermally stable microporous material comprising a molecular sieve or zeolite having an 8-ring pore opening structure, wherein the microporous material comprises iron and/or copper and retains at least 80% of its surface area and micropore volume after exposure to temperatures of up to 900° C. in the presence of up to 10 vol % water vapor for up to 1 hour.

In one embodiment, the inventive method for SCR of exhaust gases may comprise (1) adding ammonia or urea to the exhaust gas to form a gas mixture; and (2) contacting the gas mixture with a microporous crystalline composition comprising SAPO-34, having an initial surface area of at least 650 m$^2$/g, wherein the surface area, after being treated at 700-900° C. in the presence of up to 10 vol % water vapor for a time ranging from 1 to 16 hours, is at least 80% of the initial surface area; such that the $NO_x$ and ammonia of the gas mixture is converted to nitrogen and water. In one embodiment, the $NO_x$ of the exhaust gas are substantially converted.

The inventive method may be performed using a microporous crystalline composition comprising SAPO-34 that has been cation exchanged with iron, wherein iron oxide is at least 0.20 weight percent of the total weight of the microporous crystalline composition, and wherein the SAPO-34 has an initial surface area of at least 250 m$^2$/g, and wherein the surface area, after being treated at temperatures up to 900° C. in the presence of up to 10 vol % water vapor for up to 1 hour, is at least 10% of the initial surface area. Likewise, the inventive method may also be performed using a microporous crystalline composition comprising SAPO-34 cation exchanged with copper, wherein copper oxide is at least 1.0 weight percent of the total weight of the microporous crystalline composition, and wherein the SAPO-34 has an initial surface area of at least 500 m$^2$/g, and wherein the surface area, after being treated at temperatures of up to 900° C. in the presence of up to 10 vol % water vapor for up to 1 hour, is at least 80% of the initial surface area.

It has been found that such methods result in the substantial conversion of NO$_x$ and ammonia of the gas mixture to nitrogen and water. The microporous crystalline materials of the present invention show surprisingly high stability and high reduction of NO$_x$ activity over large pore zeolites.

The microporous crystalline materials of the present invention, including SAPO-34, may also be useful in the conversion of oxygenate-containing feedstock into one or more olefins in a reactor system. In particular, the compositions may be used to convert methanol to olefins.

There is also disclosed a method of making the crystalline material according to the present invention. In one embodiment, this includes mixing together an organic structural directing agent, such as a tetraethylammonium hydroxide solution (e.g., 35% TEAOH), a precursor of aluminum (e.g., pseudoboehmite alumina), and de-ionized water. To such a mixture, other known ingredients, including a source of iron or copper, if desired, and silica sol can be added while stirring, to form a gel. Crystallization seeds, such as a particular zeolite, may be added to the gel to form a desired molar composition.

The gel can then be heated in an autoclave for a time and temperature to provide a substantially pure phase composition after cooling, washing, and filtering the product. As one skilled in the art would appreciate, the product can achieve a desired SAR and/or remove organic residue upon calcination.

The present invention is also directed to a catalyst composition comprising the microporous crystalline material described herein. The catalyst composition may also be cation-exchanged, particularly with iron or copper.

In one embodiment, the present invention is directed to a catalyst composition comprising a microporous crystalline composition comprising SAPO-34 having an initial surface area of at least 650 m$^2$/g, wherein the surface area, after being treated at temperatures of up to 900° C. in the presence of up to 10 vol % water vapor for up to 16 hours, is at least 80% of the initial surface area and a matrix material. In another aspect of the invention, the catalyst composition may comprise a cation-exchanged SAPO-34 composition, particularly with iron or copper.

Any suitable physical form of the catalyst may be utilized, including, but not limited to: a channeled or honeycombed-type body; a packed bed of balls, pebbles, pellets, tablets, extrudates or other particles; microspheres; and structural pieces, such as plates or tubes.

The invention will be further clarified by the following non-limiting examples, which are intended to be purely exemplary of the invention.

EXAMPLES

Example 1

SAPO 34—Medium, Non-Uniform Crystals

Pseudoboehmite alumina, phosphoric acid, silica sol (Ludox LS30), TEAOH solution, and deionized water were mixed together to form a gel. The gel was stirred at room temperature for about 30 min before charged to an autoclave. The autoclave was heated to 150° C. and maintained at the temperature for 60 hours. After cooling, the product was recovered by filtration and washed with deionized water. The product was then dried and calcined to remove any organic residue. The resulting product was medium, non-uniform crystals. The resulting properties are listed below in Table 1.

Example 2

SAPO-34—Large, Uniform Crystals

Pseudoboehmite alumina, phosphoric acid, silica sol (Nyacol 20$_4$0NH$_4$), TEAOH solution, and deionized water were mixed together to form a gel. The gel was stirred at room temperature for about 30 min before charged to an autoclave. The autoclave was heated to 180° C. and maintained at the temperature for 12 hours. After cooling, the product was recovered by filtration and washed with deionized water. The product was then dried and calcined to remove organic. The resulting product was large, uniform crystals. The resulting properties are listed below in Table 1.

Example 3

High-Silica Chabazite

High-silica chabazite (structure code CHA) was synthesized according to examples in U.S. Pat. No. 4,544,538, which is herein incorporated by reference. Pure CHA materials, with SAR of 30-40 were obtained. After filtering, washing, and drying, the product was calcined at 550° C. for 10 hours. To remove residual sodium, the product was slurried in 2 liters of 2 M NH$_4$NO$_3$ solution and stirred at 80° C. for 2 hours. The resulting properties are listed below in Table 1.

Example 4

SAPO-18

SAPO-18 (structure code AEI) was synthesized according to the procedure outlined in J. Chen et al., Catal. Lett. 28 (1994) 241, which is herein incorporated by reference. Pseudoboehmite alumina, phosphoric acid, silica sol, N,N-diisopropylethylamine (DIPEA), and deionized water were mixed to form a gel. The gel was stirred at room temperature for 120 min before being charged to an autoclave. The autoclave was heated to 190° C. and maintained at this temperature for 48 hours. After cooling, the product was recovered by filtration and washed with deionized water. The product was then dried and calcined at 550° C. to remove organic. The resulting properties are listed below in Table 1.

Comparative Example 1

Low-Silica Chabazite

Low-silica chabazite (structure code CHA) was synthesized according to examples of U.S. Pat. No. 5,026,532, which is herein incorporated by reference. After filtering, washing, and drying, the product was calcined at 550° C. To remove residual sodium and potassium, the product was then washed in a solution containing 0.25 M HNO$_3$ and 4 M NH$_4$NO$_3$ at 80° C. for 2 hours. The resulting properties are listed below in Table 1.

Comparative Example 2

SAPO 34—Small, Non-Uniform Crystals

Al isopropoxide, phosphoric acid, tetraethyl orthosilicate, TEAOH solution, and deionized water were mixed together to form a gel with the following composition:

0.33 $SiO_2$: 1.0 $Al_2O_3$: 1.0 $P_2O_5$: 1.0 TEAOH:51 $H_2O$

The gel was stirred at room temperature for about 30 min before charged to an autoclave. The autoclave was heated to 180° C. and maintained at the temperature for 12 hours. After cooling, the product was recovered by filtration and washed with deionized water. The product was then dried and calcined to remove any organic. The resulting product was small crystals (less than 0.2 micron in size). The resulting properties are listed below in Table 1.

TABLE 1

| | Example 1 | Example 2 | Example 3 | Example 4 | Comparative Example 1 | Comparative Example 2 |
|---|---|---|---|---|---|---|
| Gel Composition | 0.4 $SiO_2$: 1.0 $Al_2O_3$: 1.0 $P_2O_5$: 1.0 TEA | 0.6 $SiO_2$: 1.0 $Al_2O_3$: 1.0 $P_2O_5$: 0.7 TEA | | 0.6 $SiO_2$: 1.0 $Al_2O_3$: 0.9 $P_2O_5$: 1.6 DIPEA | | 0.33 $SiO_2$: 1.0 $Al_2O_3$: 1.0 $P_2O_5$: 1.0 TEA |
| Fresh Crystals | | | | | | |
| $SiO_2/Al_2O_3$ molar ratio (SAR) | | | 28 | | 6.3 | |
| Surface area (m2/g) | 677 | 745 | 798 | 696 | 577 | 566 |
| Micropore volume (cc/g) | 0.27 | 0.29 | 0.30 | 0.25 | 0.21 | 0.18 |
| Acidity (mmol/g) | 1.00 | 1.00 | 0.75 | | 1.54 | 0.72 |
| After 900° C. 10 vol % water 16 hr aging | | | | | | |
| Surface area (m²/g) | 607 | 698 | 663 | | | 409 |
| Micropore volume (cc/g) | 0.22 | 0.27 | 0.24 | | | 0.13 |
| Acidity (mmol/g) | 0.40 | 0.57 | 0.05 | | | 0.01 |
| Fe Ion-exchange | | | | | | |
| $Fe_2O_3$ wt % | 0.32 | 0.27 | 1.4 | | | |
| Surface area (m²/g) | 306 | 686 | 793 | | | |
| After 900° C. 10 vol % water 16 hr aging: | | | | | | |
| Surface area (m²/g) | 39 | 444 | 780 | | | |
| $NO_x$ Conversion (%) at 300° C. | 10.7 | 10.2 | 88.7 | | | |
| $NO_x$ Conversion (%) at 400° C. | 25.8 | 35.3 | 90.4 | | | |
| Cu Ion-exchange | | | | | | |
| CuO wt % | 2.08 | 1.97 | 2.2 | 1.8 | 2.0 | |
| Surface area (m²/g) | 558 | 681 | 747 | 669 | 557 | |
| After 900° C. 10 vol % water 16 hr aging | | | | | | |
| Surface area (m²/g) | 13 | 4 | 669 | | | |
| After 700° C. 10 vol % water 16 hr aging | | | | | | |
| Surface area (m²/g) | 544 | 683 | 762 | 639 | 10 | |

Hydrothermal Aging Tests

The foregoing samples were hydrothermally aged at temperatures ranging from 700-900° C. in the presence of 10 vol % water vapor for between 1 and 16 hours to simulate automotive exhaust aging conditions. The activities of the hydrothermally aged materials for $NO_x$ conversion, using $NH_3$ as reductant, were tested with a flow-through type reactor. Powder zeolite samples were pressed and sieved to 35/70 mesh and loaded into a quartz tube reactor. The gas stream conditions are set forth in Table 2. Reactor temperature was ramped and $NO_x$ conversion was determined with an infrared analyzer at each temperature interval. The results are set forth in Table 2 below.

TABLE 2

Ion-exchange with Cu and $NO_x$ reduction with $NH_3$

| | Example 1 | Example 2 | Example 3 | Example 4 |
|---|---|---|---|---|
| After 700° C., 10 vol % water vapor, 16 hr aging | | | | |
| Surface area (m²/g) | 544 | 683 | 762 | 639 |
| $NO_x$ Conversion at 200° C.* | | | 97.6 | 92.0 |
| $NO_x$ Conversion at 250° C.* | 91.2 | 92.2 | | |
| $NO_x$ Conversion at 300° C.* | 91.3 | 91.8 | 97.9 | 94.2 |
| $NO_x$ Conversion at 400° C.* | 90.5 | 92.8 | 93.7 | 90.6 |
| * $NH_3$-SCR of $NO_x$ reaction conditions: | 500 ppm $NO_x$; $NH_3$/NO = 1.0; 5 vol % $O_2$; balance $N_2$; SV = 50,000 h⁻¹. | | | |
| After 800° C., 10 vol % water vapor, 16 hr aging | | | | |
| Surface area (m²/g) | 517 | 657 | | |
| $NO_x$ Conversion at 250° C.** | 84.7 | 89.8 | | |
| $NO_x$ Conversion at 300° C.** | 88.9 | 91.3 | | |
| $NO_x$ Conversion at 400° C.** | 88.0 | 86.3 | | |
| ** $NH_3$-SCR of $NO_x$ reaction conditions: | 500 ppm $NO_x$; $NH_3$/NO = 1.0; 5 vol % $O_2$; balance $N_2$; SV = 100,000 h⁻¹. | | | |
| After 900° C., 10 vol % water vapor, 1 hr aging | | | | |
| Surface area (m²/g) | | 632 | 669 | |
| $NO_x$ Conversion at 200° C.*** | | 83.1 | 90.7 | |
| $NO_x$ Conversion at 300° C.*** | | 90.6 | 86.9 | |
| $NO_x$ Conversion at 400° C.*** | | 83.1 | 79.9 | |
| *** $NH_3$-SCR of $NO_x$ reaction conditions: | 500 ppm NO; $NH_3$/NO = 1.0; 5 vol % $O_2$; balance $N_2$; SV = 50,000 h⁻¹. | | | |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with the true scope of the invention being indicated by the following claims.

What we claim is:

1. A hydrothermally stable microporous crystalline material comprising SAPO-34 having a crystal size greater than 0.3 microns, which after exposure to temperatures ranging from 700 to 900° C. in the presence of up to 10 volume percent water vapor for a time of 16 hours, retains at least 80% of its surface area and micropore volume and an acidity of at least 0.35 mmol/g.

2. A microporous crystalline material of claim 1, wherein said crystalline material comprises iron and/or copper.

3. A microporous crystalline material of claim 2, wherein said iron and/or copper are introduced into said solid by liquid-phase or solid ion-exchange or incorporated by direct-synthesis.

4. A microporous crystalline material of claim 1, wherein said SAPO-34 contains $SiO_2$ in an amount ranging from 1-20%.

5. A microporous crystalline material of claim 1, wherein said SAPO-34 has a crystal size ranging from 0.3 to 5.0 microns.

6. A microporous crystalline material of claim 1, having an initial surface area of at least 650 m²/g.

7. A microporous crystalline material of claim 1, having an initial micropore volume of at least 0.25 cc/g.

8. A hydrothermally stable microporous crystalline material for SCR of $NO_x$ with urea or ammonia, wherein said crystalline material comprises iron and/or copper containing SAPO-34 having a crystal size greater than 0.3 microns which retains at least 80% of its surface area and micropore volume after exposure to temperatures of up to 900 ° C. in the presence of up to 10 volume percent water vapor for up to 1 hour.

9. A microporous crystalline material of claim 8, wherein the iron and/or copper are introduced into said material by liquid-phase or solid ion-exchange or incorporated by direct-synthesis.

10. A microporous crystalline material of claim 8, wherein said iron comprises at least 0.20 weight percent of the total weight of said material.

11. A microporous crystalline material of claim 8, wherein said copper comprises at least 1.0 weight percent of the total weight of said material.

12. A microporous crystalline material of claim 8, wherein said SAPO-34 contains 1-20% of $SiO_2$.

13. A method for making silicoaluminophosphate molecular sieve comprising SAPO-34, said method comprising:
   mixing sources of alumina, silica, and phosphate with a TEAOH solution and water to form a gel;
   heating said gel in an autoclave at a temperature ranging from 150 to 180° C. to form a product;
   cooling and optionally washing said product in water;
   calcining said product to form a molecular sieve comprising SAPO-34 having a crystal size greater than 0.3 microns and containing from 1-20% $SiO_2$, wherein said molecular sieve after exposure to temperatures ranging from 700 to 900° C. in the presence of up to 10 volume percent water vapor for 16 hours, retains at least 80% of its surface area and micropore volume and has an acidity of at least 0.35 mmol/g.

14. The method of claim 13, wherein said source of alumina is pseudoboehmite alumina.

15. The method of claim 13, wherein said source of silica is a silica sol.

16. The method of claim 13, wherein said source of phosphate is phosphoric acid.

17. The method of claim 13, further comprising a cation exchange step.

18. The method of claim 17, wherein said cation is chosen from iron and copper.

19. The method of claim 13, wherein said gel is heated in an autoclave at a temperature of 180° C.

20. A microporous crystalline material of claim 1, wherein said exposure comprises a temperature of 900° C.

21. A microporous crystalline material of claim 1, wherein said crystalline material has an acidity value of at least 0.4 mmol/g after exposure.

22. A microporous crystalline material of claim 21, wherein said crystalline material has an acidity value ranging from 0.4 to 1.00 mmol/g after exposure.

23. A microporous crystalline material of claim 1, wherein said SAPO-34 has a crystal size ranging from 0.3 to 5.0 microns.

24. A hydrothermally stable microporous crystalline material comprising SAPO-34, having a crystal size greater than 0.3 microns and an acidity of at least 0.35 mmol/g and retains at least 80% of its surface area and micropore volume after hydrothermal aging comprising exposure to temperatures ranging from 700 to 900° C. in the presence of up to 10 volume percent water vapor for a time of 1 to 16 hours.

25. A microporous crystalline material of claim 24, wherein said SAPO-34 contains $SiO_2$ in an amount ranging from 1-20%.

26. A microporous crystalline material of claim 24, having an initial surface area of at least 650 $m^2/g$.

27. A microporous crystalline material of claim 24, having an initial micropore volume of at least 0.25 cc/g.

28. A hydrothermally stable microporous crystalline material of claim 8, wherein said SAPO-34 has a crystal size ranging from 0.3 to 5.0 microns.

29. A microporous crystalline material of claim 2, wherein said copper comprises about 2.0 weight percent of the total weight of said material.

30. A microporous crystalline material of claim 8, wherein said copper comprises about 2.0 weight percent of the total weight of said material.

* * * * *

UNITED STATES PATENT AND TRADEMARK OFFICE
CERTIFICATE OF CORRECTION

PATENT NO. : 7,645,718 B2 Page 1 of 1
APPLICATION NO. : 12/055639
DATED : January 12, 2010
INVENTOR(S) : Hong-Xin Li et al.

It is certified that error appears in the above-identified patent and that said Letters Patent is hereby corrected as shown below:

In claim 13, column 12, line 49, "and has an" should read --and an--.

Signed and Sealed this

Sixth Day of April, 2010

David J. Kappos
*Director of the United States Patent and Trademark Office*